C. G. SMITH.
MEANS FOR ADVANCING AND LOCKING MACHINES ADAPTED TO FACILITATE CONSTRUCTING AND REPAIRING OF RAILWAYS AND THE LIKE.
APPLICATION FILED NOV. 17, 1910.
989,933.
Patented Apr. 18, 1911.
5 SHEETS—SHEET 1.
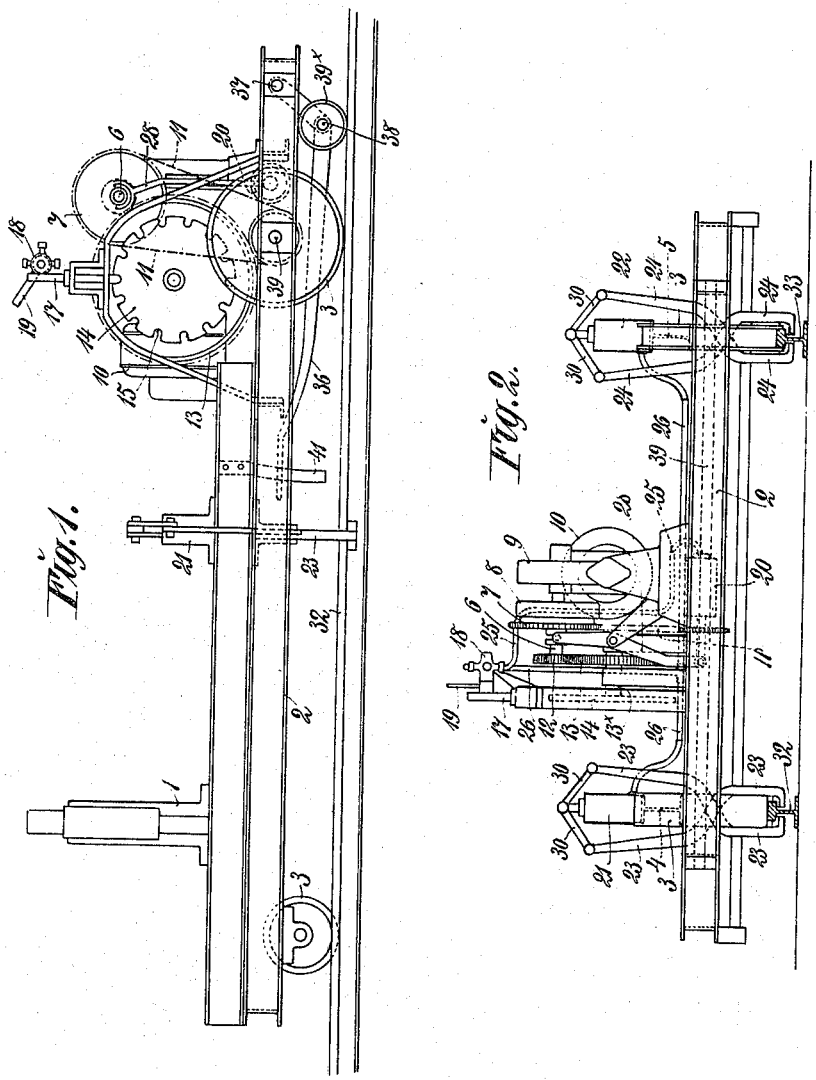

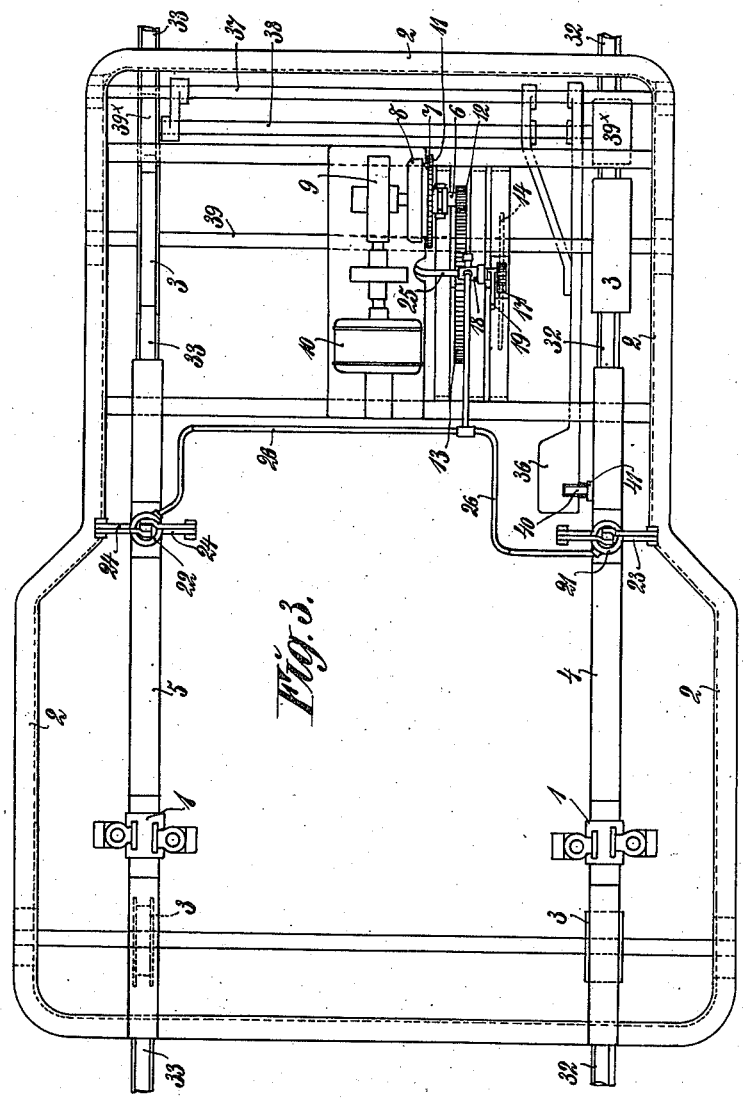

C. G. SMITH.
MEANS FOR ADVANCING AND LOCKING MACHINES ADAPTED TO FACILITATE CONSTRUCTING AND REPAIRING OF RAILWAYS AND THE LIKE.
APPLICATION FILED NOV. 17, 1910.
989,933.
Patented Apr. 18, 1911.
5 SHEETS—SHEET 3.
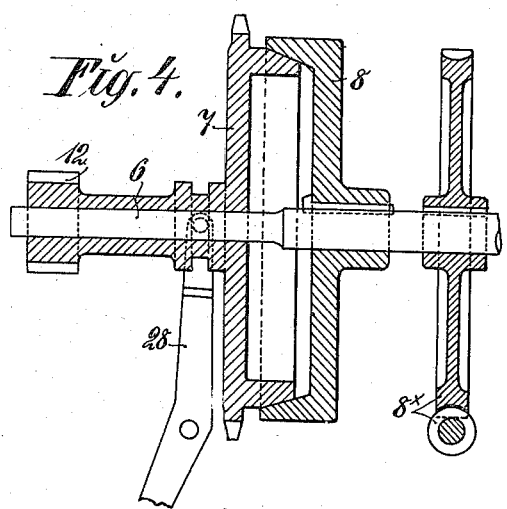
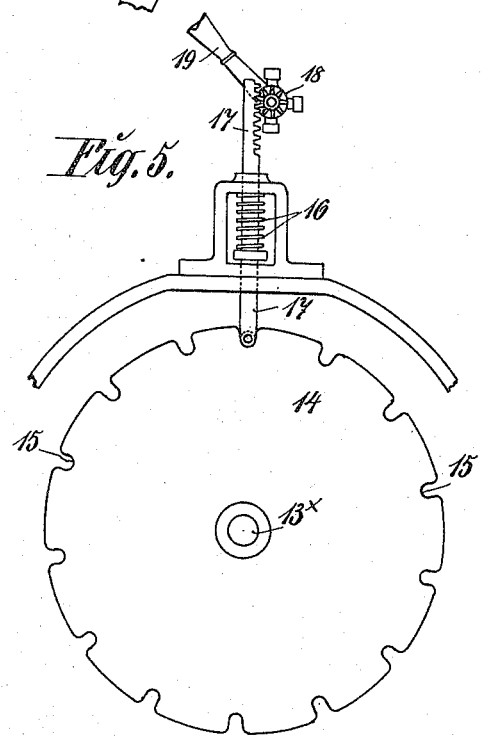
Witnesses
Chas. H. Smith
A. Serrell
Inventor
Earl G. Smith,
by Harold Serrell
his atty C. G. SMITH.
MEANS FOR ADVANCING AND LOCKING MACHINES ADAPTED TO FACILITATE CONSTRUCTING
AND REPAIRING OF RAILWAYS AND THE LIKE.
APPLICATION FILED NOV. 17, 1910.

989,933. Patented Apr. 18, 1911.
5 SHEETS—SHEET 4.

C. G. SMITH.
MEANS FOR ADVANCING AND LOCKING MACHINES ADAPTED TO FACILITATE CONSTRUCTING AND REPAIRING OF RAILWAYS AND THE LIKE.
APPLICATION FILED NOV. 17, 1910.
989,933.
Patented Apr. 18, 1911.
5 SHEETS—SHEET 5.
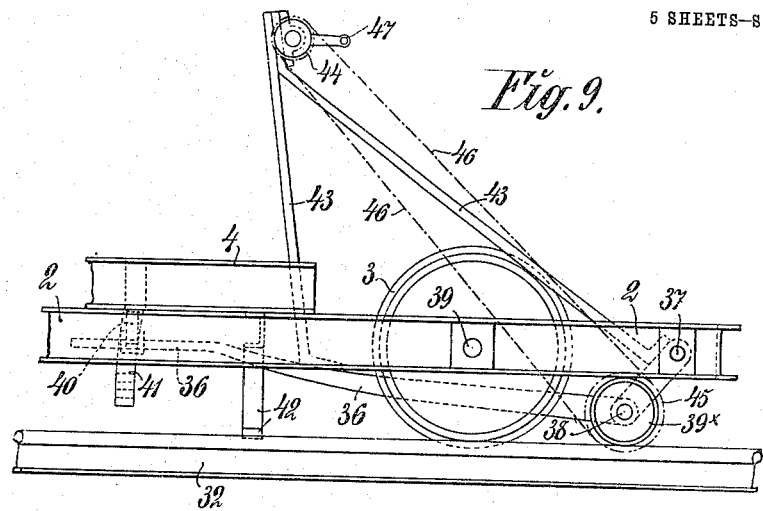
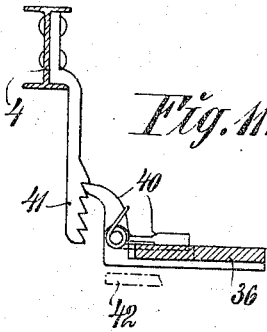
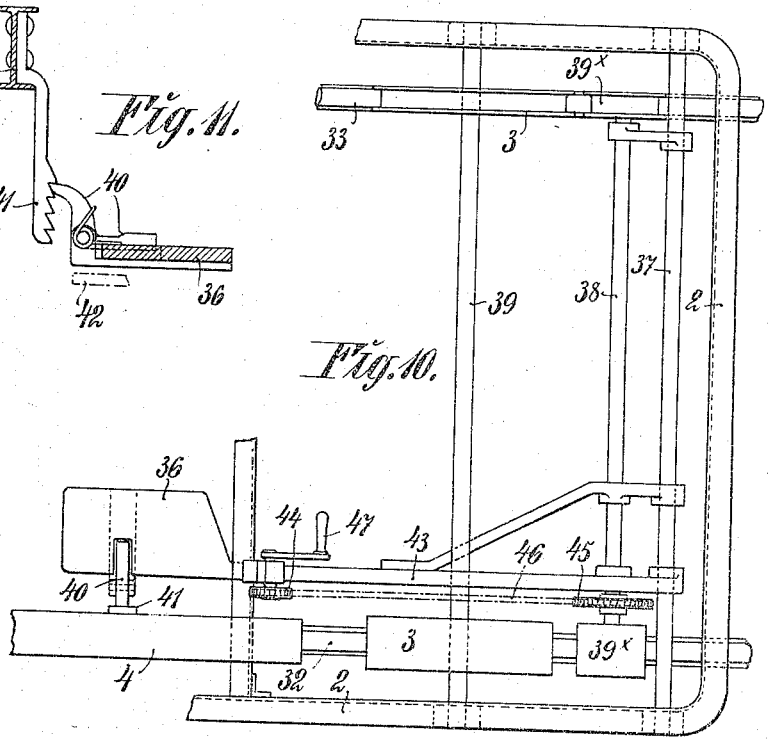

UNITED STATES PATENT OFFICE.

CARL GUSTAF SMITH, OF STOCKHOLM, SWEDEN.

MEANS FOR ADVANCING AND LOCKING MACHINES ADAPTED TO FACILITATE CONSTRUCTING AND REPAIRING OF RAILWAYS AND THE LIKE.

989,933.

Specification of Letters Patent. Patented Apr. 18, 1911.

Application filed November 17, 1910. Serial No. 592,769.

*To all whom it may concern:*

Be it known that I, CARL GUSTAF SMITH, a subject of the King of Sweden, and resident of Karlbergsvägen 40, Stockholm, in the Kingdom of Sweden, have invented certain new and useful improvements in means for advancing and locking machines adapted to facilitate the constructing and repairing of railways and the like, of which the following is a specification, reference being had therein to the accompanying drawings.

For facilitating the constructing and repairing of railways and tramways suitable auxiliary machines can be used with great advantage, for instance a machine for inserting the spikes or screw bolts into the ties or for removing the old spikes from the ties when changing the spikes and so on. In order that the machine may easily be moved and adjusted in the proper operating position, it is provided with running wheels or is mounted on a trolley, so that it can be moved on the rails. As the work is to be performed at each of the ties successively, the advancing of the machine is effected preferably automatically *i. e.* in such manner, that the machine, while it is advanced by its motor, is stopped automatically and locked to the rails, also automatically, in the proper operating position at the next tie, as much time is thereby saved on comparison with the normally effected moving, stopping and adjusting of the machine.

This invention relates to means for the said purpose.

In the accompanying drawings a machine for spiking the rails to the ties is shown, arranged in accordance with this invention.

Figure 6:
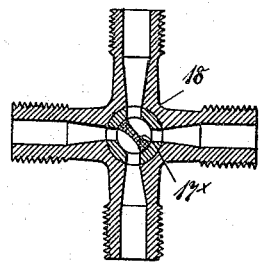
Figure 7:
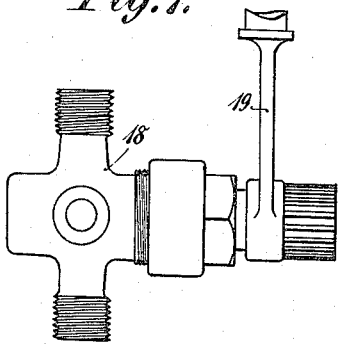
Figure 8:
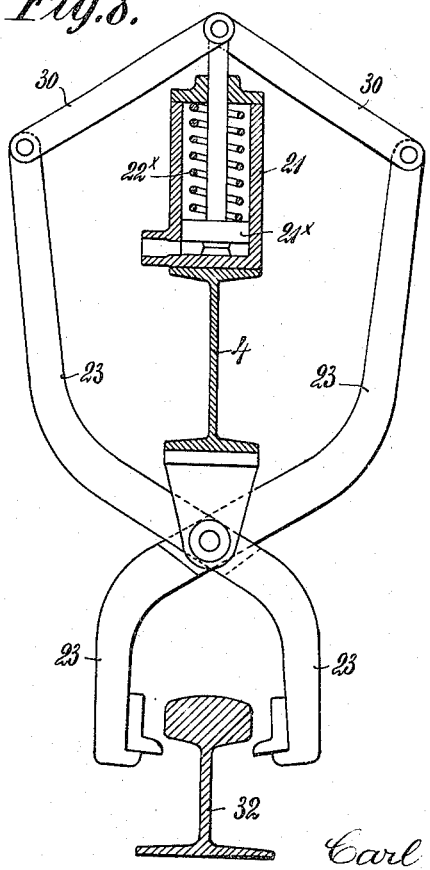

Figure 1 is a side view, Fig. 2 an end view, and Fig. 3 a plan view of the machine. Fig. 4 is a section of a clutch. Fig. 5 shows the starting mechanism of the machine. Fig. 6 is a section and Fig. 7 is a side view of a cock belonging to the said starting mechanism. Fig. 8 is a section of a cylinder for a compressed fluid and a side view of parts acted upon by the piston of the cylinder for locking the machine to the rails. Fig. 9 is a side view and Fig. 10 is a plan view of a mechanism for moving the machine manually. Fig. 11 shows a pawl and ratchet mechanism belonging to the said mechanism.

The spiking mechanism, comprising hammer devices actuated pneumatically or in any other suitable manner, means for feeding the spikes and so on, is not shown in the drawings, only the guides 1 for the up and down moved hammer devices are shown, two hammer devices being provided at each of the rails. The spiking mechanism is constructed in substantially the same manner as the one described in the co-pending application Serial No. 537,867, filed January 13, 1910, by the applicant herein for improvements in machines for spiking rails to ties.

As shown in the drawings, the base part of the machine consists of a trolley, comprising substantially a frame 2, running wheels 3 and beams 4 and 5 extending longitudinally of the trolley. The said beams support the guides 1, 1 and other operating parts. The beams 4, 5 as also the frame 2 may be arranged in several other different manners, in accordance with the construction of the machine and the purpose of the same. A shaft 6 journaled in the trolley is connected with an electric motor 10 or a motor of any other suitable class by means of a friction clutch 7, 8 and a worm gear, provided in the casing 9, and the motion is transmitted from the said shaft to one of the shafts 39 of the running wheels of the trolley by an endless chain 11 or any other suitable motion transmitting device. The said friction clutch is shown in Fig. 4, which also shows the worm gear 8ˣ. A pinion 12 on the shaft 6 engages a toothed wheel 13, to the shaft 13ˣ of which a disk 14 is fixed, provided in its periphery with notches 15, which are engaged by a slide 17, acted upon by a spring 16. The said slide 17 consists of a rack, which meshes with a pinion provided on the plug 17ˣ of a many-way cock 18, Figs. 6 and 7, which plug has a lever arm 19. The admission of compressed air to a cylinder 20 for engaging the clutch 7, 8, and to cylinders 21, 22 for actuating pairs of tongs 23, 24 adapted to hold the trolley to the rails, is controlled by the cock 18. The pipe communicating with the cylinder 20 is designated with 25 and the pipes communicating with the cylinders 21 and 22 are designated with 26. The compressed air is also shut off by the said cock and discharged through the same. The cock, the slide and the disk 15 are shown on a greater scale in Fig. 5. The piston of the cylinder 20 is connected with the clutch 7, 8 by a lever 28. One or more pairs of tongs are provided at each of the rails 32, 33 for holding the machine to the rails, while the spikes are forced into the ties. The tongs at one of the rails is connected with the beam 4 by its pin, and the tongs at the other rail is connected with the beam 5. The lower ends of their shanks are suitably shaped to embrace the rail. The top ends of the shanks are connected by links 30 with the piston 21˟ acting in the cylinder 21. As the said piston is raised, which is effected by compressed air being led into the cylinder, the tongs are caused to embrace the rail forcibly, thus locking the trolley. If the compressed air, passing from the reservoir, is shut off by means of the cock and the air in the cylinders 21, 22 is discharged, the tongs will be opened by springs, located in the said cylinders and acting upon the tongs. Fig. 8 is a cross section of the cylinder 21.

The motor rotates continually. While the rack 17 engages one of the notches 15 of the disk 14, the plug 17˟ of the cock has such a position, that the compressed air can not pass into the cylinder 20, owing to which fact the clutch 7, 8 is held in the disconnected position by a spring, acting upon the piston of the cylinder 20. The machine is then at a standstill. Moreover, the compressed air is admitted to the cylinders 21, 22, so that the trolley is locked to the rails in proper position above the tie. By admitting compressed air to the hammer devices, which is effected by means of a special cock, the said devices are caused to operate. When the spikes have been forced into the ties or the operation has been effected at the tie, for which the machine is adapted, the rack 17 is raised manually by means of the lever arm 19 out of engagement with the disk 14. The cock 18 is thereby shifted in such manner, that the air is discharged from the cylinders 21, 22, in consequence whereof the tongs 23, 24 are opened, and air is permitted to pass into the cylinder 20, so that the clutch 7, 8 is connected. The trolley is now caused to move and the disk 14 is rotated slowly around its shaft. The rack 17 can not descend before the next notch 15 of the disk 14 is opposite the same, in which moment the rack engages the said notch, acted upon by the spring 16, and the cock is shifted into its former position. The compressed air is thereby discharged from the cylinder 20 and admitted into the cylinders 21 and 22. Owing to the said facts the trolley is stopped and the machine locked to the rails. Consequently, the distance, performed by the trolley is fixed by the disk 14, the notches of which are located at a distance from each other, corresponding to the distance between the ties. The said distance is shorter at the joint of the rails and for that reason the notches of the disk corresponding thereto are located nearer to each other.

Consequently, it is only necessary to start the machine by actuating the lever arm 19, the machine is then moved to and adjusted automatically in the next operating position. If the length of the rails is greater or shorter than the ordinary one, a disk of greater or shorter diameter respectively is substituted for the disk 14 and a slide or rack of suitable length is substituted for the rack 17.

The machine may be advanced also manually, which is sometimes necessary for adjusting the same at the joints of the rails and in such cases when two spikes are to be forced into the tie at the same side of the rail. The provisions adapted therefor are shown in Figs. 9, 10 and 11. A foot lever 36 is swingable around a shaft 37, fixed in the frame. In arms provided on the said shaft a shaft 38 is journaled, to which shaft 38 wheels 39˟ are fixed, bearing against the rails 32, 33. In the front end of the foot lever 36 a pawl 40 is provided, consisting of a small bell crank lever and engaging a toothed piece 41 fixed to the frame. If the foot lever is depressed, as far as permitted by an abutment 42, the rear end of the machine is raised from the rails by the wheels 39˟ bearing against the rails, so that the rear running wheels of the trolley are brought out of contact with the rails. The foot lever is kept in the said position by the pawl 40. A small frame 43 is supported by the foot lever, in which frame a sprocket wheel 44 is journaled, connected with a sprocket wheel 45, fixed to the shaft 38 or to one of the running wheels 39, by means of a chain 46, passing around the said sprocket wheels. The shaft of the sprocket wheel 44 is provided with a handle 47. After the machine has been raised by depressing the foot lever, it is moved by rotating the handle 47, the feed device described above being then not acted upon. As the machine is to be removed into its original, lower position the operator sets his foot on the arm of the bell crank lever, forming the pawl 40, which extends above the foot lever 36, so that, as the foot lever is depressed, the pawl is disengaged from the toothed piece 41 and the machine is lowered and its running wheels remounted on the rails, as the foot lever is released.

The construction of the bottom frame of the machine, consisting in the drawings of a trolley, is, evidently, modified and adapted to the purpose of the machine and the admitting device for the driving medium, consisting of the cock 18 in the drawings, is also modified and adapted to the driving medium, as easily understood without any further explanations.

Having now described my invention, what I claim as new and desire to secure by Letters Patent is:

1. In an auxiliary machine for the constructing and repairing of railways and the like the combination of a trolley or the like, carrying the mechanical auxiliary means for performing the work, and means on the said trolley for advancing the trolley and stopping the same automatically, step by step, in accordance with the distances between the places in the track, where the work is to be performed, the said means comprising a source of motive power and a motion transmitting device between the same and the running wheels of the trolley for advancing the trolley, a clutch for bringing the said motion transmitting device into operation and out of the same, a disk provided with notches and rotated by the said source of motive power, a spring actuated slide coöperating with the said disk, and a device for engaging the said clutch, which device is connected with the said slide and controlled by the different positions of the same determined by the said disk, so that, after engagement has been effected, the rotating disk after a certain period is stopped by the slide and the latter disengages the clutch, so that the trolley is stopped.

2. In an auxiliary machine for the constructing and repairing of railways and the like the combination of a trolley, carrying the means for performing the work, and means on the trolley for advancing the same, stopping the same automatically, step by step, and locking the same to the rails, comprising a motion transmitting device between a source of motive power and the running wheels of the trolley, a clutch provided in the said motion transmitting device, pairs of tongs fixed to the trolley and adapted to lock the same to the rails when at a standstill, a disk provided with notches and rotated by the said motion transmitting device, a spring actuated slide, coöperating with the said disk and occupying different positions, determined by the disk, and means for disengaging the clutch and closing the tongs, controlled by the slide, so that the clutch is disengaged at one of the positions of the slide but the tongs closed, while at another position of the slide the clutch is engaged but the tongs opened.

3. In an auxiliary machine for the constructing and repairing of railways and the like the combination of a trolley carrying the means for performing the work, means on the trolley for advancing and stopping the same automatically and step by step, the said means comprising a disk provided with notches and connected with a motion transmitting device for advancing the trolley, a spring actuated slide, which coöperates with the said disk and the position of which is determined by the disk, a cylinder for compressed air, a piston, operating in the said cylinder, and a clutch provided in the said motion transmitting device, a many way cock for admitting the air into the said cylinder and discharging the same, the plug of which cock meshes with the said slide and is controlled by the same, so that in one of the positions of the slide and as the disk is at a standstill, the clutch is disengaged, but is engaged in another position of the slide.

4. In an auxiliary machine for the constructing and repairing of railways and the like the combination of a trolley, carrying the means for performing the work, means for advancing the trolley and stopping the same automatically, step by step, comprising a disk provided with notches and connected with a motion transmitting device for advancing the trolley, a slide, which coöperates with said disk and the position of which is controlled by the disk, a clutch provided in the said motion transmitting device, a cylinder for a compressed medium, the piston of which is connected with the said clutch, a many way cock provided in the conduit for the compressed medium, which cock is connected with the slide and in accordance with the position of the same admits the compressed medium into the cylinder or shuts off the conduit and discharges the medium from the cylinder for engaging and disengaging the clutch respectively.

5. In an auxiliary machine for the constructing and repairing of railways and the like the combination of a trolley carrying the means for performing the work, and means for advancing the trolley and stopping the same automatically, step by step, and locking the trolley to the rails, comprising a motion transmitting device connected with the running wheels of the trolley for advancing the trolley, a clutch provided in the said motion transmitting device, a disk provided with notches, a slide coöperating with the disk, a cylinder for a compressed medium, a conduit for the said medium, a cock provided in the conduit for engaging and disengaging the clutch, pairs of tongs for locking the trolley to the rails, and cylinders for the compressed medium, the pistons of which are connected with the said tongs, the compressed medium being admitted to the said cylinders or shut off from the same by the said cock, according as the clutch is disengaged and engaged respectively, in order that the trolley may be at a standstill or be moved.

6. In an auxiliary machine for the constructing and repairing of railways and the like the combination of a trolley, carrying the means for performing the work, means for advancing the trolley and stopping the same automatically, step by step, and means acting upon the running wheels of the trolley for advancing the same manually and independently of the aforesaid means, the said manually actuated means comprising an elevating device, by means of which the trolley can be raised, so that the said running wheels are brought out of contact with the rails and other running wheels are caused to bear upon the same, and a handle and a suitable motion transmitting device connecting the said handle with the running wheels last mentioned for advancing the trolley manually.

7. In an auxiliary machine for the constructing and repairing of railways and the like the combination of a trolley, carrying the means for performing the work, a motor, means connecting the motor with the running wheels of the trolley for advancing the trolley, means for stopping the trolley automatically, step by step, and, if desired, means for advancing the trolley manually, the said means comprising a foot lever, which, when depressed, raises the trolley and moves the running wheels out of contact with the rails and forces other running wheels into contact with the same, a support carried by the said foot lever, a handle journaled in the said support, sprocket wheels and an endless chain, connecting the said handle with the running wheels last mentioned, and a pawl and ratchet mechanism for locking the foot lever in its depressed position.

In witness whereof, I have hereunto signed my name in the presence of two subscribing witnesses.

CARL GUSTAF SMITH.

Witnesses:
HEDING MELINDER,
GUSTAF ISFALT.